(12) United States Patent
Brunsbach

(10) Patent No.: US 6,387,423 B1
(45) Date of Patent: *May 14, 2002

(54) PACKAGED PRECOOKED PASTA

(75) Inventor: Fritz Brunsbach, Wipperfürth (DE)

(73) Assignee: Bonroyal-Werk, Wipperfürth (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/945,729

(22) PCT Filed: Apr. 18, 1996

(86) PCT No.: PCT/EP96/01621

§ 371 Date: Nov. 10, 1997

§ 102(e) Date: Nov. 10, 1997

(87) PCT Pub. No.: WO96/35331

PCT Pub. Date: Nov. 14, 1996

(30) Foreign Application Priority Data

May 9, 1995 (DE) .......................... 195 16 874

(51) Int. Cl.[7] .......................... A21D 10/02; A23L 3/10; B65B 55/02
(52) U.S. Cl. .................. 426/113; 426/128; 426/549; 426/602; 426/412; 426/523; 426/524
(58) Field of Search ................. 426/106, 112, 426/113, 128, 549, 392, 410, 412, 415, 520, 521, 524, 602, 523

(56) References Cited

U.S. PATENT DOCUMENTS

| | | | | |
|---|---|---|---|---|
| 4,466,985 A | | 8/1984 | Tsen et al. .................. 426/131 |
| 4,741,911 A | * | 5/1988 | McIntyre et al. ............ 426/325 |
| 5,526,736 A | * | 6/1996 | Buriani et al. ................. 99/470 |
| 5,562,938 A | * | 10/1996 | Lee et al. .................... 426/106 |
| 5,590,777 A | * | 1/1997 | Weiss et al. ................. 206/439 |

FOREIGN PATENT DOCUMENTS

| | | | |
|---|---|---|---|
| DE | 1863980 | | 10/1962 |
| DE | 1586587 | | 8/1970 |
| DE | 7623490 | | 11/1976 |
| DE | 3018118 | | 3/1981 |
| EP | 602953 | | 6/1994 |
| EP | 626137 | | 11/1994 |
| FR | 2502907 | | 10/1982 |
| FR | 1310494 | | 3/1984 |
| JP | 60 180553 | * | 9/1985 |
| JP | 60180553 A | * | 9/1985 |
| JP | 3-247249 | * | 11/1991 |
| JP | 09065841 A | * | 3/1997 |
| LU | 43934 | | 8/1963 |

OTHER PUBLICATIONS

Food Chemistry, 3rd Edition Owen Fennema Marcel Dekker Inc. NY, p. 134, Jan. 1996.*
Derwent search results pp. 1–3 (Translated abstracts of JP10271971A, JP60180553A, JP09065841A, EP838412 A1) Mar. 22, 1999.*

* cited by examiner

Primary Examiner—Keith Hendricks
Assistant Examiner—Drew Becker
(74) Attorney, Agent, or Firm—Jacobson Holman, PLLC

(57) ABSTRACT

The invention relates to packaged, unfilled or filled, precooked pasta foods in portions of between 150 g and 500 g, characterized by being sealed within a sheet which is heat-resistant up to at least 125° C. Oxygen-impermeable composite sheets are preferably employed as the sheets. The invention further relates to a method for the preparation of such packaged pasta foods.

11 Claims, No Drawings

PACKAGED PRECOOKED PASTA

The present invention relates to packaged, unfilled or filled, precooked pasta foods in a plastic sheet, and to a method for the preparation of such pasta foods.

The advantages of Italian pasta or noodles of all kinds are sufficiently known. They enjoy an ever increasing popularity, long having lost the reputation of being fattening. While rich in carbohydrates, with up to 75%, they are low in fat, about 3%. Noodles have a lasting satisfying effect, even when prepared, for example, with a low-fat tomato sauce. Further, noodles contain up to 15% of vegetable proteins, about 1% of minerals, such as potassium and calcium, vitamins of the B group, and vitamin A. They are quickly and readily prepared, and are easily digestible. With the exception of the Swabian "Spätzle", pasta or noodles are not frequently prepared in the kitchen at home these days. The pasta industry has long been supplying excellent quality noodles in many variations.

Demanded by the ultimate consumer are foods having a long shelf-life, preferably packaged in portions of 150 to 500 g, which are quickly and readily prepared, i.e. can be served within a few minutes.

In the field of instant meals, two trends have become prevailing. At one hand, precooked instant meals (e.g., chicken fricassee) are offered in bags, which, sealed in a package which is suitable for freezing and deepfrozen, can be stored for about 18 months. Packages suitable for freezing are characterized by low temperature stability, air and water impermeability, tearing or breaking resistance, and resistance to fats and acids. They are necessary since otherwise the foods would dry up from the cold, and/or freezer burns could occur. Such instant products must be thawed and then heated before they can be eaten.

On the other hand, there are so-called partially prepared meals (e.g. rice bags) which are contained in a normal plastic sheet, unsuitable for freezing, and which can be stored at room temperature for several months. However, they must be cooked before they can be eaten. In some cases, the cooking can be performed within the bag.

However, partially prepared meals require an expenditure of time of 10 to 20 minutes. For ensuring a long shelf-life, such products must be absolutely sterile. To achieve this, they must be subjected to steam sterilization in an autoclave under pressure at a temperature of above 112° C. for about 20 minutes. For maintaining the sterile condition, vacuum packages may be employed.

Filled, uncooked pasta are known which, in a sterilized and vacuum-packaged condition, can be kept in cold storage (T≦10° C.) for three to six months.

Further, packaged precooked filled pasta are known. However, the cooking must be performed externally, i.e. outside the package. They can be kept only in cold storage. When not refrigerated, they must be quickly consumed.

The German Utility Model DE-GM 1 863 980 describes a sterilizable soft package using heat-sealable aluminum composite sheets, the sheets being coated on the outside with a heat-resistant, non-thermoplastic plastic layer. Such packages are suitable for the storing of foods such as sausages, meat products, vegetables and beverages as well as instant meals. However, the foods such as meal products etc. can only be processed when they are completely or almost completely precooked. DE-A 30 18 118 describes a heat-sealable package for the commercially customary sterilization and unfrozen storage of foods which package is made of a polymeric laminate sheet consisting of three layers. The foods mentioned include sugar syrups, ketchups, fruit juices, jellies, preserved foods and strongly acidic foods as well as potatoes, tomatoes, cereals, carrots, beefstew and French beans as well as syrup and tomato paste.

DE-OS 15 86 587 describes a method for the preparation of foods and unit packages therefor consisting of a specially shaped bag which will not shrink when immersed in boiling water, is resistant to fat and has a closure which can be opened and resealed manually. It can be filled with a number of foods including spaghetti and tomato sauce. A drawback of this method is that the pasta will soften very much since the liquid uptake from the sauce is almost unlimited, a negative aspect which is even increased when the pasta are reheated.

DE-GM 76 23 490 describes a package for instant meals, such as goulash, chicken or turkey breast, fish etc., wherein the food packages consist of a tubing of plastic sheets which has a welding seam perpendicular to its longitudinal dimension. The instant meal is contained in the space formed between the two welding seams. Heating is performed only at 80° C.

It has been the object of the present invention to provide packaged, unfilled or filled, precooked pasta foods in portions of between 150 g and 500 g which are sealed within a sheet. They are to have a shelf-life in cold storage (T≦10° C.) of at least 30 days. In addition, of course, the pasta are to be tasty and have good eating properties as well as be inexpensive. Further, the storage period should be increased to six months without cold storage. The method for the preparation of such pasta should still be simple and inexpensive.

This object has been achieved is a surprisingly simple way by sealing the uncooked pasta within a plastic sheet together with the necessary amount of water and vegetable oil, followed by cooking and sterilizing under pressure within the bag. The advantage on the part of the consumer is a saving of time since blanching (brief preliminary cooking before freezing) is omitted. Also, the difficulties in establishing the right cooking period when cooking pasta, resulting in too soft, gluey pasta, are eliminated.

The consumer will obtain perfectly precooked pasta or, in other words, "pasta al dente", which only need to be heated in a cooking pan or microwave oven.

Thus, the subject matter of the invention are packaged, unfilled or filled, precooked pasta foods in portions of between 150 g and 500 g, sealed in a sheet which is heat-resistant up to at least 125° C.

Heat-resistant, oxygen-impermeable composite sheets are preferably employed, which increases the storage period of the pasta according to the invention to six months without cold storage.

As heat-sealable packaging sheets approved under food-law, polyethylene and polypropylene sheets have proven useful. The composite sheets mostly contain an additional barrier layer of EVOH (polyester sheet, 12 $\mu$m) with a lacquer backing and have thicknesses of 20 to 200 $\mu$m, preferably 50 to 150 $\mu$m.

A further advantage arising from the use of a composite sheet, in addition to the saving of time from the omission of the thawing process, is the removal of a risk of freezer burns (caused by a torn package).

The method according to the invention for the preparation of pasta can be applied to a wide variety of noodle types, such as cappelletti ("small caps"), ravioli, tortellini, fusilli, nidine (=noodle nests), penne, spirelli or fusilli (spirals), torteloni, rigatoni, "Maultaschen" (a kind of meat-filled noodle bags), cannelloni ("large tubes"), agnolotti (large ravioli), fettuccine (broad tape noodles), macaroni and farfalle. As the filling, there may be mentioned, for example, meat, vegetable, cheese and fish fillings.

For the preparation of the pasta according to the instant invention, the un-cooked pasta in a plastic sheet are preferably subjected to step-cooking according to the sprinkling method. For this purpose, the pasta, filled or unfilled, are pressed flat together with the necessary amount of water and vegetable oil, and sealed. This essentially removes air and oxygen from the package. Care is to be taken that an overfilling with water/vegetable oil does not take place since otherwise the sealing can no longer be effected in an optimum manner. The required water and vegetable oil quantity for one package is selected to be sufficient, on one hand, for the desired swelling and, on the other hand, to ensure complete water uptake by the product. Vegetable oil and water are preferably added in a mutually emulsified condition in order to achieve a uniform dosage. The sealed packages are placed in the autoclave preferably in a cascade-like stacked form. After closing the autoclave, the temperature within the boiler is brought to between 80 and 90° C., and the pasta packages in the autoclave are sprayed with live steam using steam injection according to the sprinkling method. After about five minutes, the water/vegetable oil emulsion in the package has reached the temperature of the environment, being about 90° C., so that the package will expand. The vegetable oil causes the individual pasta pieces not to glue together during the cooking process. At a temperature of about 90° C., the cooking process in the package within the closed system will start. At the same time, the swelling of and water uptake by the pasta starts. The packages, in a slightly expanded condition, are preferably rotated once, more preferably four or five times, by 180°. The arrangement of the individual packages in the form of a cascade causes the heating and cooking to be uniform. The cooking process is completed after 10 to 15 minutes while a pressure of 0.8 to 2.0 bar has build in the autoclave. The final temperature is at least 112° C. for the sterilization to be sufficient. The latter is mostly completed after 10 to 15 minutes wherein F values (=sterilization value) of between 1.5 and 2.5, preferably 1.9, are achieved.

In a preferred embodiment of the method according to the invention, oxygen-impermeable composite sheets are employed as plastic sheets.

One advantage of the method according to the invention is that the Maillard reaction which results in a browning of the pasta can be suppressed.

The invention will be further illustrated by the following Examples.

EXAMPLE 1

Preparation of a packaged, unfilled, precooked pasta, based on 250 g of pasta 250 g of unfilled, uncooked pasta are filled in a 80 μm thick PP sheet together with a freshly prepared emulsion of 345 ml of water and 15 ml of vegetable oil. The package is pressed flat and then sealed. The filled and sealed packages are stacked in the form of a cascade and placed in a sprinkling autoclave. After closing the autoclave, heating is performed in a stepwise manner to 90° C. at first and then to 115° C. by introducing steam, resulting in an increased pressure of about 2 bar. After about 20 minutes, the cooking process and the steam sterilization are completed. The system is cooled down to 15° C., and the packages are removed from the autoclave. In cold storage, the food can be kept for 30 days. When a 100 μm thick composite sheet with oxygen barrier (PP-EVOH-PP) is used, the packaged food can be stored at room temperature for six months.

EXAMPLE 2

Preparation of a packaged, filled pasta (for example, filled with meat), based on 250 g of pasta 250 g of filled, uncooked pasta are filled in a plastic sheet together with an emulsion of 250 ml of water and 10 ml of vegetable oil, and the package is pressed flat. After sealing, cooking and sterilizing is performed as in Example 1. In cold storage, the food can be kept for 30 days. When a 100 μm thick composite sheet with oxygen barrier (PP-EVOH-PP) is used, the packaged food can be stored at room temperature for six months.

What is claimed is:

1. Packaged food consisting of:
  a) precooked pasta food combining
      pasta, unfilled or filled, swelled with
      water and vegetable oil, together, in a mutually emulsified, freshly prepared condition, and
  b) a sealed composite sheet containing said precooked pasta food,
      wherein said pasta food is present in a portion of between 150 g and 500 g,
      wherein said water is present in an amount sufficient (i) for swelling the pasta and (ii) for complete water uptake by the pasta,
      wherein said vegetable oil is present in an amount sufficient to avoid sticking together of said pasta, and
      wherein said sealed composite sheet is oxygen-impermeable and heat-resistant up to at least 125° C.

2. A method for preparing packaged pasta food comprising the sequential steps of
  a) swelling unfilled or filled, uncooked pasta with a freshly prepared emulsion consisting of water and vegetable oil to effect a portion of pasta food, said pasta being present in an amount of between 150 g and 500 g, said water being present in an amount sufficient (i) to swell the pasta and (ii) for complete water uptake by the pasta, and said vegetable oil being present in an amount sufficient to avoid sticking together of said pasta; followed by
  b) sealing said portion within an oxygen-impermeable composite sheet which is heat resistant up to at least 125° C.; followed by
  c) cooking and sterilizing said portion under pressure.

3. The method according to claim 2, characterized in that the uncooked pasta, swelled with the freshly prepared emulsion of water and vegetable oil, is pressed flat and then sealed.

4. The method according to claim 2, characterized in that the sealed portion is heated at above 112° C. in an autoclave followed by cooling down to below 25° C.

5. The method according to claim 2, characterized in that the sealed portion, after being heated at above 80° C. and being in a slightly expanded condition, is rotated by 180° at least once.

6. The method according to claim 5, characterized in that the portion is rotated by 180° four or five times.

7. The method according to claim 3, characterized in that the sealed portion is heated at above 112° C. in an autoclave followed by cooling down to below 25° C.

8. The method according to claim 3, characterized in that the portion, after being heated at above 80° C. and being in a slightly expanded condition, is rotated by 180° at least once.

9. The method according to claim 8, characterized in that the portion is rotated by 180° four or five times.

10. The method according to claim 4, characterized in that the portion, after being heated at above 80° C. and being in a slightly expanded condition, is rotated by 180° at least once.

11. The method according to claim 10, characterized in that the portion is rotated by 180° four or five times.

* * * * *